Patented Aug. 29, 1933

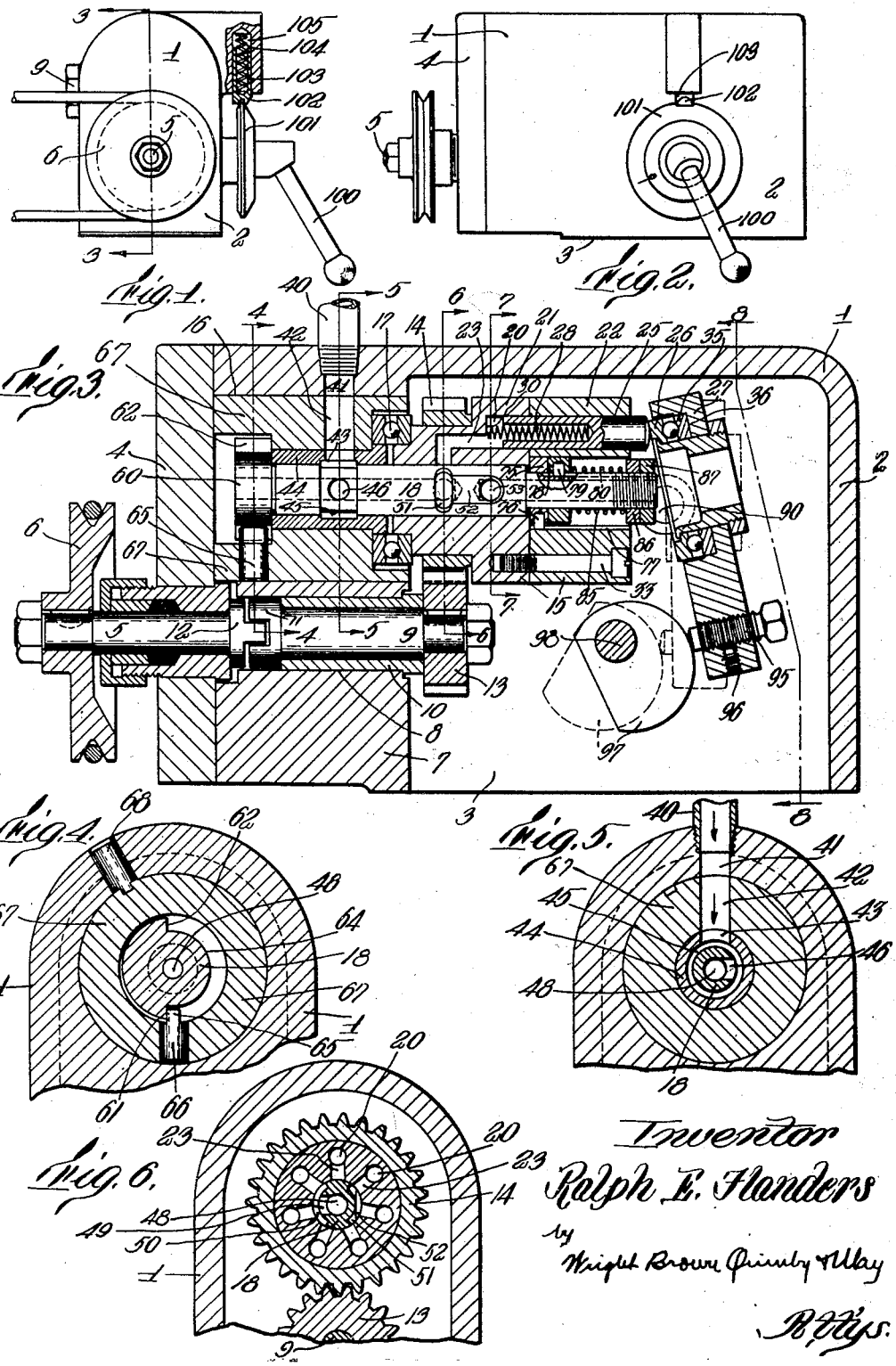

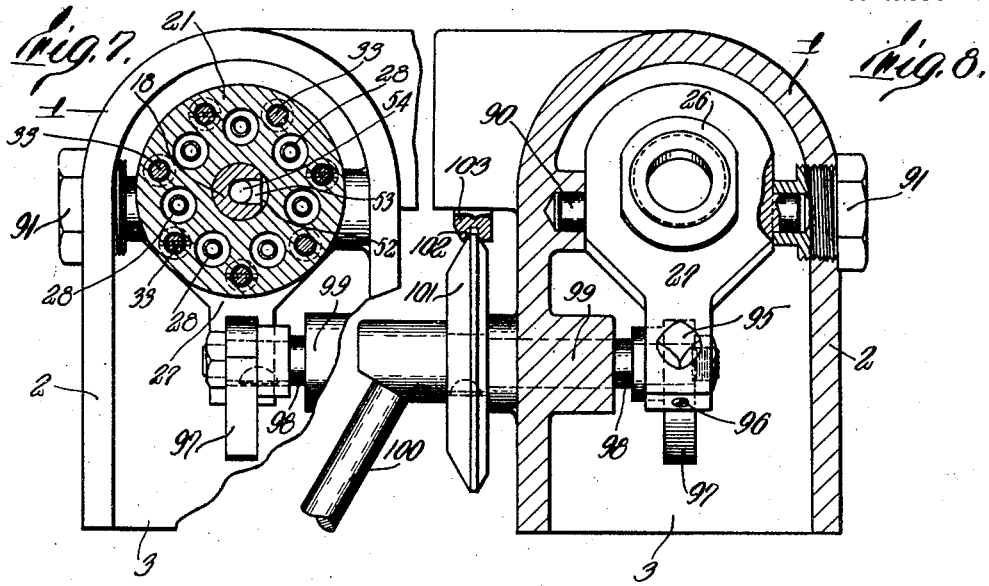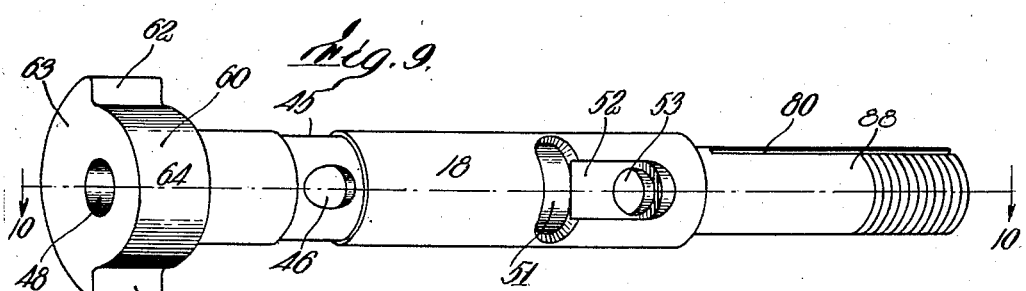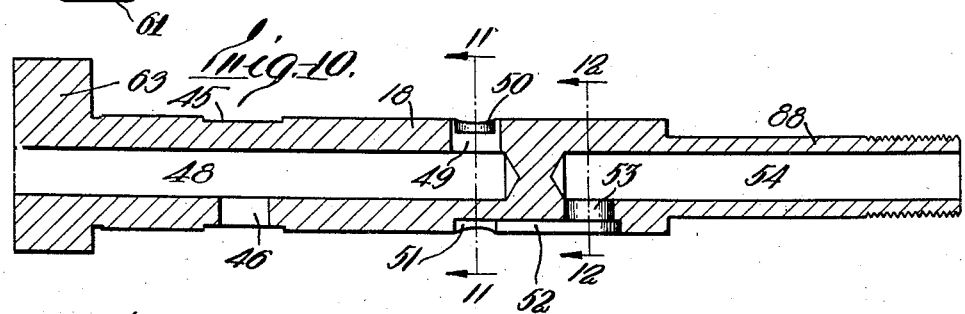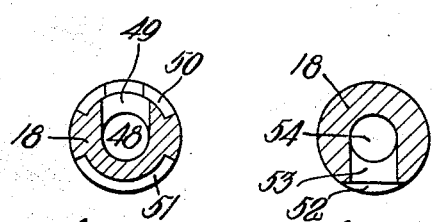

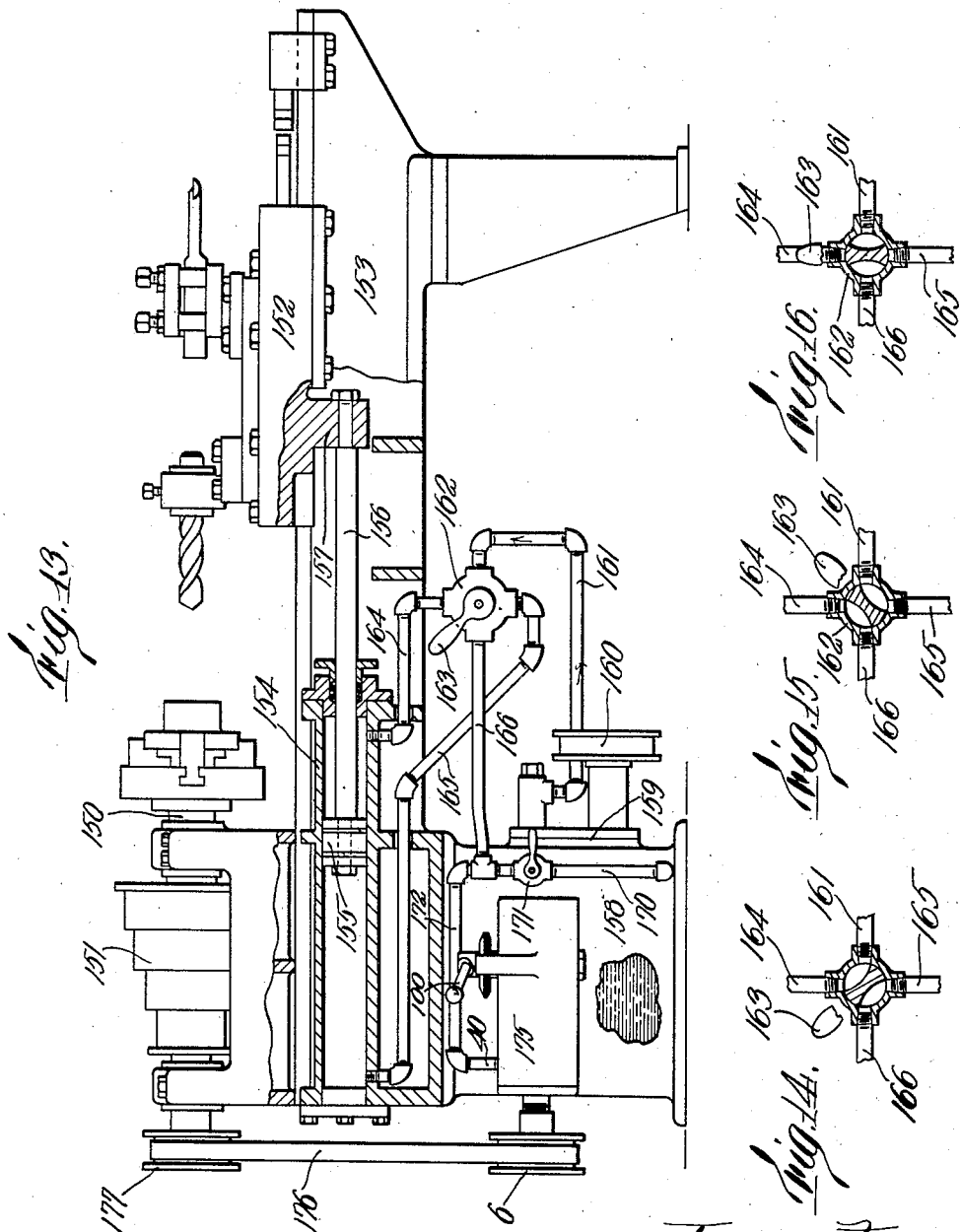

1,924,738

UNITED STATES PATENT OFFICE 1,924,738

HYDRAULIC POWER TRANSMISSION AND METERING DEVICE THEREFOR

Ralph E. Flanders, Springfield, Vt., assignor to Jones & Lamson Machine Company, Springfield, Vt., a corporation of Vermont Application January 28, 1931. Serial No. 511,806

14 Claims. (Cl. 29—42)

This invention relates to hydraulic power transmission systems and more particularly to such systems in which it is desired at times to control the rate of motion of one member in accordance with the rate of motion of another.

In accordance therewith one of the movable members is actuated by a hydraulic motor and at certain times the speed of this motor is controlled by passing the liquid, preferably after passing through the motor, through a liquid meter, the metering rate of which is controlled by the speed of motion of the other movable member.

This invention relates to a construction of meter suitable for use in such a system and which is simple in construction, quiet in operation, and the metering rate of which for any given rate of speed of its controlling member may be readily varied as desired. It also relates to the hydraulic system wherein the meter is also a motor so that it not only determines the rate of speed of the part driven by the main motor but also itself drives or helps to drive its controlling mechanism.

For a more complete understanding of this invention, reference may be had to the accompanying drawings in which Figures 1 and 2 are end and side elevations, respectively, of the meter device.

Figure 3 is a section to a larger scale on line 3—3 of Figure 1.

Figures 4 to 8 inclusive are detail sections on the correspondingly numbered section lines of Figure 3.

Figure 9 is a detail in perspective.

Figure 10 is a section on line 10—10 of Figure 9.

Figures 11 and 12 are sections on lines 11—11 and 12—12, respectively, of Figure 10.

Figure 13 is a side elevation partly broken away and in section of a lathe having its tool slide moved by the main motor in accordance with the spindle speed which controls the metering rate of the meter, the spindle being in turn driven partly by the meter.

Figures 14 to 16 inclusive are detail sections showing the control valve of Figure 13 in different positions.

Referring to Figures 1 to 12, the metering device includes a casing 1 comprising a box-shaped element 2 open at its lower end at 3 and closed off at one end by a cover member 4. Through this cover member 4 extends an actuating shaft 5 having means for rotating it, such as a belt pulley 6 secured to its outer end. Inwardly of the cover member 4 is positioned a boss 7 which has a bore 8 for receiving a stub shaft 9 in a suitable bearing bushing 10, this stub shaft having a coupling member 11 on one end by which it is coupled for rotation by a mating coupling 12 carried by the shaft 5. On the inner end of the shaft 9 is carried a pinion 13 which meshes with a gear ring 14 carried by a cage element 15. This cage element is journaled for rotation on a sleeve valve member 18, a thrust ball bearing being shown at 17 to take endwise thrust against the block 67 secured in the boss 7, by reason of the pressure of the fluid as will later appear.

This cage member, as shown, is provided with a central bore for the reception of the stationary sleeve valve member 18 shown detached in Figure 9. The cage member is provided with a plurality of openings 20 arranged in circular series about its axis of rotation and parallel thereto. For ease in construction the cage may be formed of two parts 21 and 22 secured together as by means of the screws 33, the openings 20 extending entirely through the parts 22 and somewhat into the part 21. In the part 21 these openings communicate through passages 23 with the central bore in which the valve member 18 is positioned. Each of these openings also contains axially slidable therein a plunger 25 which is normally pressed outwardly so that its outer end firmly engages a bearing ring 26 carried by a swash plate 27, by means of a light spring 28 seated in a socket in the rear end of each plunger, and bearing against a wall portion 30 at the back of the opening 20 adjacent to the passage 23. The bearing ring 26 is shown as a raceway portion of a thrust ball bearing, the opposite raceway portion 35 of which is seated in an annular groove 36 in the swash plate 27. This permits the cage member to be rotated while the plungers 25 are held in contact with the member 26 without undue friction, the swash plate, as will later appear, being normally stationary though angularly adjustable. At 40 is shown a fluid supply pipe which leads through a passage 41 of the casing 2 and a passage 42 in the bearing sleeve 67 through a port 43 through a stationary bushing 44 to an annular passage 45 formed by a peripheral groove in the valve member 18. From the passage 45 the fluid passes through ports such as 46 into a central bore 48 of the valve member, which extends throughout a portion of its length, as shown best in Figure 10, and communicates through one side through a passage 49 with an arcuate groove 50 in its outer face. Substantially oppositely disposed to this arcuate groove 50 is a second arcuate groove 51 which communicates with a passage 52 extending axially of the valve on its outer face, this leading through a port 53 into a central passage 54 of the valve in alinement with the passage 48 but out of communication therewith. The arcuate passages 50 and 51 are in axial alinement with the rear ends of the passages 23 leading to the plunger openings 20 so that at all times certain of these passages 23 are open through the passage 50 to receive fluid under pressure in the pipe 40 and others are in communication through the passage 51 to the central valve passage 54 from which the fluid may escape from the open end of the valve member and into the interior of the casing 2 from which it may pass through its open lower end directly into a suitable supply tank for the fluid. The fluid under pressure should be supplied to those plunger openings in which the plungers are being permitted outward movement as the cage member rotates and those passages should be open to the exhaust which communicate with the plunger openings where the plungers are being pressed inwardly by the swash plate bearing thereon during such rotation of the cage, and the passages 50 and 51 of the valve member are disposed in proper relation for this to occur. It will be evident, however, that should the direction of rotation of the belt pulley 6 be reversed, thus reversing the direction of rotation of the cage, those plungers which previously were being permitted outward movement would then be pressed inwardly and those which were being pressed inwardly would then be permitted outward movement due to their bearing on the inclined swash plate.

In order, therefore, that the mechanism may operate with the ports and the valve correctly positioned for either direction of rotation of the cage member, it is necessary that the valve be moved to reverse its port connection when reversal of rotation of the cage member is effected. This reversal may take place by the frictional drag imparted to the valve member by rotation of the cage and in order that this frictional drag may be operative only to turn the valve member to its proper position, stops are provided for limiting the rotation of the valve member to either of its operative positions. As shown, therefore, the valve member has on its inner end a cam element 60 having spaced oppositely facing lugs 61 and 62 formed at the ends of a portion 63 of enlarged diameter opposite to a portion 64 of smaller diameter between the faces 61 and 62. Cooperating with these stop faces 61 and 62 is a stop element 65 shown as formed by a plug 66 seated in an opening the bearing block 67. This block 67 is fixed in an opening in the boss 7 as by means of a key plug 68 shown best in Figure 4. The cooperating stops 61, 62 and 66 limit the rotation of the valve member to substantially 180° to thereby reverse the positions of the arcuate passages 50 and 51 as required. In order that there may be insured a sufficient frictional engagement between the cage and the valve member, frictional clutch mechanism may be provided between the two. As shown this comprises a friction ring 75 splined to the inner face of the cage element 22 as by a pin 76 in the ring riding in a key slot 77 in the member 22. Cooperating with the friction ring 75 is a friction ring 78 similarly keyed as by a pin 79 riding in a key slot 80 in the outer face of the valve member 18, these ring members being held in frictional contact as by means of a spring 85 surrounding the valve member 18 and reacting between the friction ring 78 and adjusting and check nuts 86 and 87 threaded on the outer end of the valve member 18. These friction rings 75 and 78 are mounted on a reduced diameter portion 88 of the valve member 18.

In order that the metering capacity of the device may be varied, means should be provided for varying the angularity of the swash plate. To this end the swash plate 27 is shown as pivoted on an axis 90 and for ease in assembly one end of the pivot 90 is held in a removable plug 91 threaded into the wall 2 of the casing. The lower end of the swash plate 27 is shown as provided with a cam follower screw 95 threaded therethrough and secured in adjusted position as by a set screw 96. The follower screw 95 bears on the edge of a cam member 97 fixed to a shaft 98 by which its angularity may be adjusted. In order that the cam follower may be held against the edge of the cam 97 advantage may be taken of the pressure exerted by the liquid against the plungers. To this end the summation of the force exerted by the liquid on the plungers should be such as to exert a pressure against the swash plate on the opposite side of the pivot 90 from the cam 97. For this purpose the pivot 90 is positioned slightly out of line with the axis of rotation of the cage member and between this axis and the cam member. The shaft 98 extends out through a bearing 99 of the casing 2 and has fixed at its outer end a handle member 100 by which its angularity may be adjusted to thus determine the angularity of the swash plate from a position substantially at right angles to the axis of rotation of the cage in which position no liquid could flow through the meter, to a position substantially inclined to the axis of rotation of the cage member. The greater the inclination the greater is the range of motion permitted to the plungers and thus the greater is the amount of fluid permitted to pass at each revolution of the cage member.

In order that the cam may be held in any desired adjusted position, a frictional holding means has been illustrated. As shown this comprises a frictional wheel 101 fixed to the shaft 98 and having a V-shaped periphery against which is pressed a mating portion 102 of a friction plunger 103. This pressure is exerted by a spring 104, the spring and plunger being housed within a suitable socket 105 of the casing.

In Figure 13 is shown a hydraulic system in which the meter as previously described is well adapted for service, though it should be understood that it is not limited to this particular meter but that any hydraulic motor of suitable type could be employed. This hydraulic system is illustrated as used in connection with a lathe provided with a rotary work spindle 150 shown as provided with a cone pulley 151 by which it may be driven in the usual manner. At 152 is shown a tool slide movable on the bed 153 of the lathe toward and from the work spindle and parallel to its axis. This slide 152 is shown as moved by means of a hydraulic motor comprising a cylinder 154 within which is movable a piston 155. This cylinder 154 is held stationary in the frame of the lathe and the piston 155 is connected through a piston rod 156 with a portion 157 of the tool slide. At 158 is a reservoir for containing oil or other suitable liquid which is delivered by any suitable pumping mechanism, one end of which is shown at 159, and which may be driven as through a belt pulley 160, through a pipe 161 to a control valve 162. As shown in Figures 14 to 16 this control valve is of the four-way type. Its handle 163 may be turned to the position shown in Figure 14 admitting liquid under pressure from the pipe 161 into the pipe 164 leading to the right hand end of the cylinder 154 while connecting a pipe 165 leading to the left hand end of the cylinder 154 to the discharge pipe 166, under which conditions the piston 155 will be driven to the left, moving the tool slide toward the work spindle. If the valve handle 162 is turned to the position shown in Figure 15, the supply pipe 161 will be open to the pipe 165 leading to the left hand end of the cylinder 154 and the pipe 164 will be open to the discharge pipe 166 and the slide will be moved away from the work spindle. In the intermediate position of the handle, shown in Figure 16, both of the pipes 164 and 165 leading to opposite ends of the cylinder 154 are closed off so that the slide is locked in the position in which it happens to be when the valve is turned to this intermediate position. The discharge pipe 166 may discharge freely into the supply tank 158 through the pipe 170 when the shut off valve 171 is open, but when this valve 171 is closed the discharge must pass through a pipe 172 to the pipe 40 of the meter, this meter being indicated generally at 175. The drive pulley 6 of this meter is shown as connected by the belt 176 to pulley 177 on the outer end of the spindle 150. When it is desired to move the tool slide rapidly the valve 171 is opened and the handle 163 of the valve 162 is turned to the proper position to admit liquid to the desired end of the cylinder 154 to produce the required movement of the slide. If now a slow controlled speed of the slide is desired, as for example, when the tools carried by the slide are approaching the work or are actually operating thereon, the valve 171 is closed so that the discharge from the main motor must pass through the meter. This passage of the liquid through the meter on its way to the tank 158 tends to drive the pulley 6 and as this is connected to the work spindle this driving motion is transferred to the spindle, this acting to impart a driving force to the work spindle supplementary to that imparted thereto through the pulleys 151. As, however, the rate of rotation of the pulley 6 is controlled by the rate of rotation of the spindle 150, the rate of discharge from the supplemental motor and thus the flow of the liquid and the rate of motion of the main motor and of the slide 152 is controlled by the spindle speed in either direction, for any particular setting of the adjusting handle 100 of the meter. While the meter might be positioned in the motor supply rather than in the motor discharge, the speed control, particularly when high speeds are employed or where there are large inertia forces to be controlled, is more satisfactory when the meter is in the discharge as shown. This general arrangement of parts, as herein shown, is described and claimed in my application for patent Serial No. 468,188, filed July 15, 1930, for hydraulic system and mechanism therefor.

Of course, other adaptations of the general principle of causing the meter which controls the rate of flow of the main motor itself to act as a motor for driving its speed controlling mechanism might also be made, its application to a lathe being merely illustrative of one use.

An embodiment of this invention having thus been described, it should be evident to those skilled in the art that various changes and modifications might be made therein without departing from the spirit or scope of the invention as defined by the appended claims.

I claim:

1. A system of the class described comprising a main motor, a member moved by said motor, means for supplying fluid under pressure to said main motor, a supplementary motor in series with said main motor and acting to control by its rate of speed the rate of flow of fluid in said system, and means for controlling the rate of speed of said supplementary motor connected to be driven thereby.

2. A system of the class described comprising a main hydraulic motor, a member moved by said motor, means for supplying liquid under pressure to said motor, a supplementary motor in the discharge from said main motor and acting by its rate of speed to control the rate of liquid flow and thereby the rate of speed of said main motor, and means for controlling the rate of speed of said supplementary motor connected to be driven thereby.

3. A system of the class described comprising a main motor, a member moved by said motor, means for supplying fluid under pressure to said main motor, a supplementary motor in series with said main motor and acting to control by its rate of delivery the rate of flow of fluid in said system, and means for controlling the rate of delivery of said supplementary motor connected to be driven thereby.

4. A system of the class described comprising a main motor, a member moved by said motor, means for supplying fluid under pressure to said main motor, a supplementary motor in series with said main motor and acting to control by its rate of delivery the rate of flow of fluid in said system, means for controlling the rate of delivery of said supplementary motor connected to be driven thereby, and means for varying the rate of delivery for any given speed of drive of said controlling means.

5. A system of the class described comprising a main hydraulic motor, a member moved by said motor, means for supplying liquid under pressure to said motor, a supplementary motor in the discharge from said main motor, and acting by its rate of fluid delivery to control the rate of liquid flow and thereby the rate of speed of said main motor, and means for controlling the rate of delivery of said supplementary motor connected to be driven thereby.

6. A system of the class described comprising a main hydraulic motor, a member moved by said motor, means for supplying liquid under pressure to said motor, a supplementary motor in the discharge from said main motor, and acting by its rate of fluid delivery to control the rate of liquid flow and thereby the rate of speed of said main motor, means for controlling the rate of delivery of said supplementary motor connected to be driven thereby, and means for varying the rate of delivery for any given speed of drive of said controlling means.

7. The combination with a machine having a rotary spindle and a slide movable toward and from said spindle, of a main hydraulic motor for moving said slide, means for supplying liquid under pressure to said motor, and a supplemental motor in driving and driven relation to said spindle interposable at will in series with said main motor for controlling the rate of flow of said liquid and thereby controlling the rate of movement of said slide in accordance with the speed of rotation of said spindle.

8. The combination with a machine having a rotary spindle and a slide movable toward and from said spindle, of a main hydraulic motor for moving said slide, means for supplying liquid under pressure to said motor, and a supplemental motor in driving and driven relation to said spindle interposable at will in the discharge from said main motor for controlling the rate of flow of said liquid and thereby controlling the rate of movement of said slide in accordance with the speed of rotation of said spindle.

9. In a hydraulic power transmission system, a pump, a pair of hydraulic motors arranged in series and receiving liquid under pressure from said pump, and a mechanism driven by each of said motors, one of said motors thus acting as a metering device to regulate the rate of flow through the other of said motors and thereby to regulate the rate of motion of the mechanism driven by said other motor in accordance with the rate of motion of the other of said mechanisms.

10. A system of the class described comprising a main motor, a member moved by said motor, means for supplying fluid under pressure to said main motor, a supplementary reversible motor in series with said main motor and acting to control by its rate of speed the rate of flow of fluid in said system, and means for controlling the rate of speed of said supplementary motor connected to be driven thereby irrespective of its driven direction.

11. The combination with a machine having a rotary spindle, a main motor, a member moved by said motor, means for supplying fluid under pressure to said main motor, and a supplementary motor in driving relation to said spindle and in series with said main motor and acting to control by its rate of motion the rate of flow of fluid in said system.

12. The combination with a machine having a rotary spindle, a main motor, a member moved by said main motor, means for supplying fluid under pressure to said main motor, and a supplementary reversible motor in driving relation to said spindle for either direction of rotation thereof and in series with said main motor and acting to control by its rate of motion the rate of flow of fluid in said system.

13. The combination with a machine having a rotary spindle and a slide movable relative to said spindle, of a main hydraulic motor for moving said slide, means for supplying liquid under pressure to said motor, and a supplementary reversible motor in driving relation to said spindle irrespective of its direction of rotation and in series with said main motor for controlling the rate of flow of liquid and thereby controlling the rate of movement of said slide in accordance with the speed of rotation of said spindle.

14. The combination with a machine having a rotary spindle and a slide movable relative to said spindle, of a main hydraulic motor for moving said slide, means for supplying liquid under pressure to said motor, and a supplementary reversible motor in driving relation to said spindle irrespective of its direction of rotation and interposable at will in series with said main motor for controlling the rate of flow of liquid and thereby controlling the rate of movement of said slide in accordance with the speed of rotation of said spindle.

RALPH E. FLANDERS.